(No Model.) 5 Sheets—Sheet 1.
J. C. LOVE.
TROLLEY FOR CONDUIT RAILWAYS.
No. 511,343. Patented Dec. 26, 1893.
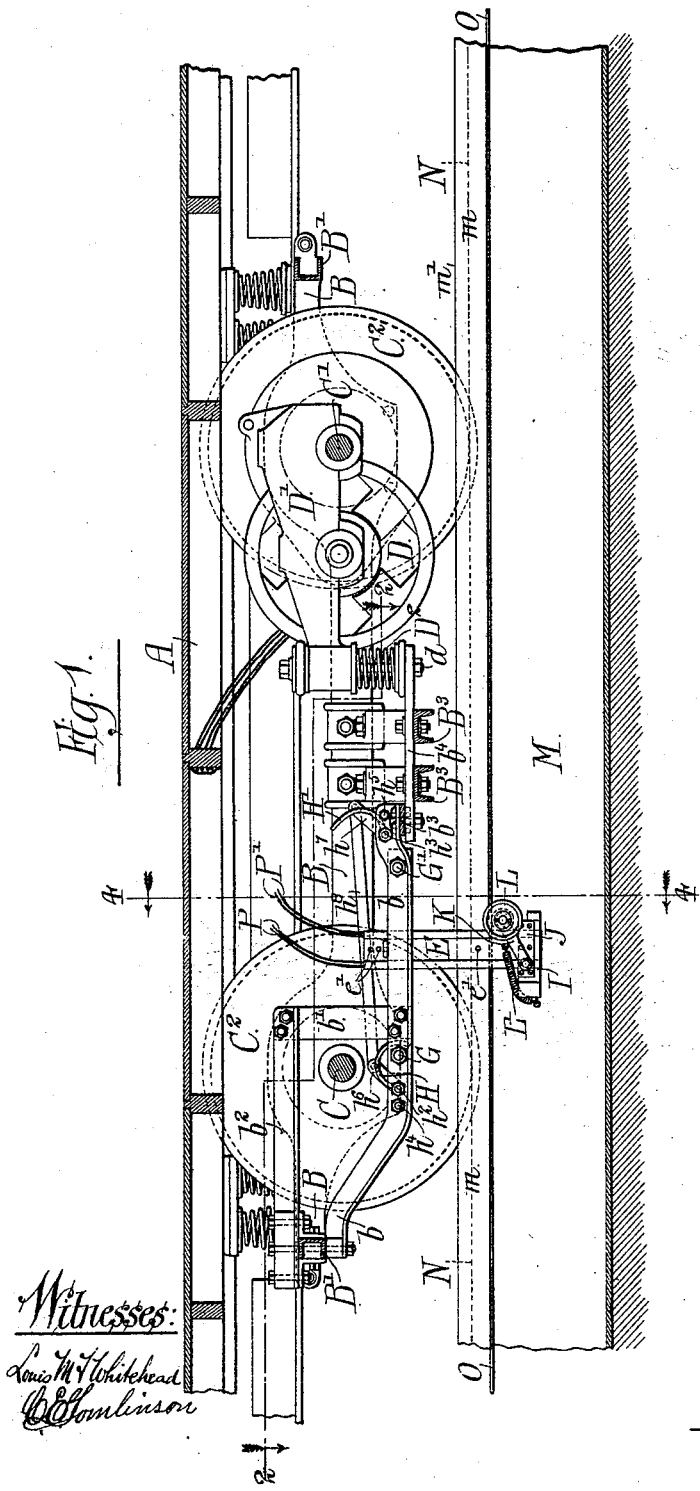
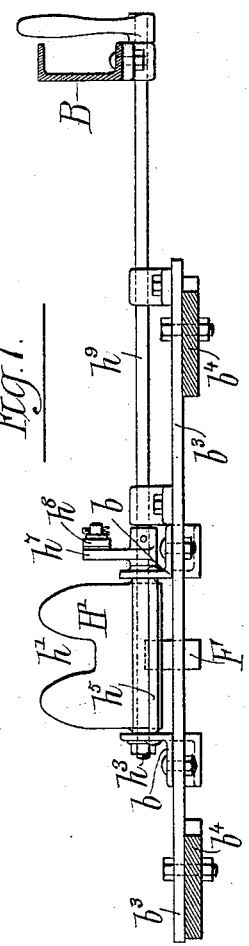
Witnesses:
Louis M. Whitehead
C. E. Tomlinson
Inventor:
John C. Love.
by Dayton, Poole & Brown
Attorneys.

(No Model.) 5 Sheets—Sheet 2.
J. C. LOVE.
TROLLEY FOR CONDUIT RAILWAYS.
No. 511,343. Patented Dec. 26, 1893.
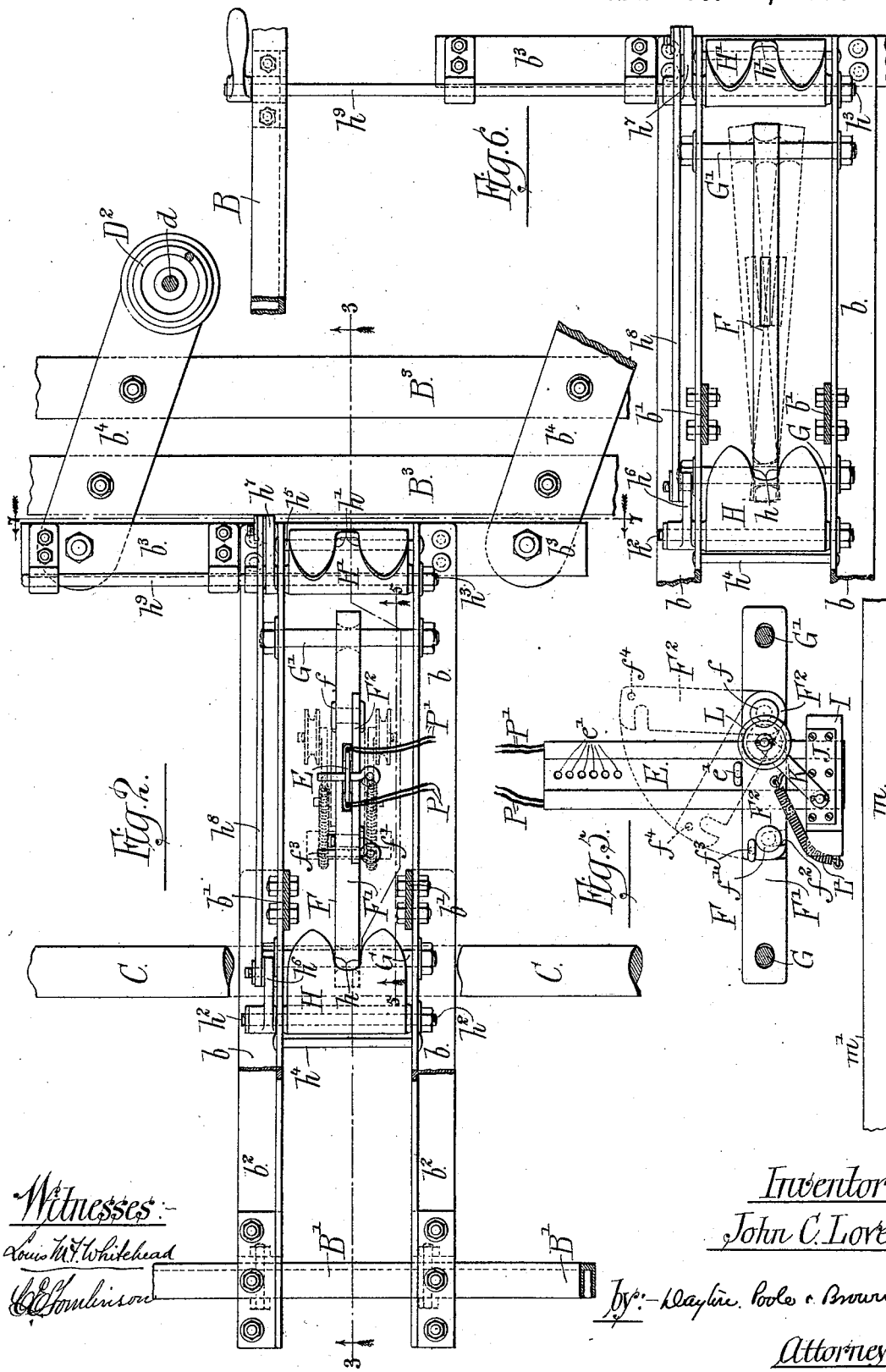
Witnesses:
Louis M. F. Whitehead
C. E. Tomlinson
Inventor:—
John C. Love.
By:— Dayton, Poole & Brown
Attorneys.

(No Model.) 5 Sheets—Sheet 3.
J. C. LOVE.
TROLLEY FOR CONDUIT RAILWAYS.
No. 511,343. Patented Dec. 26, 1893.
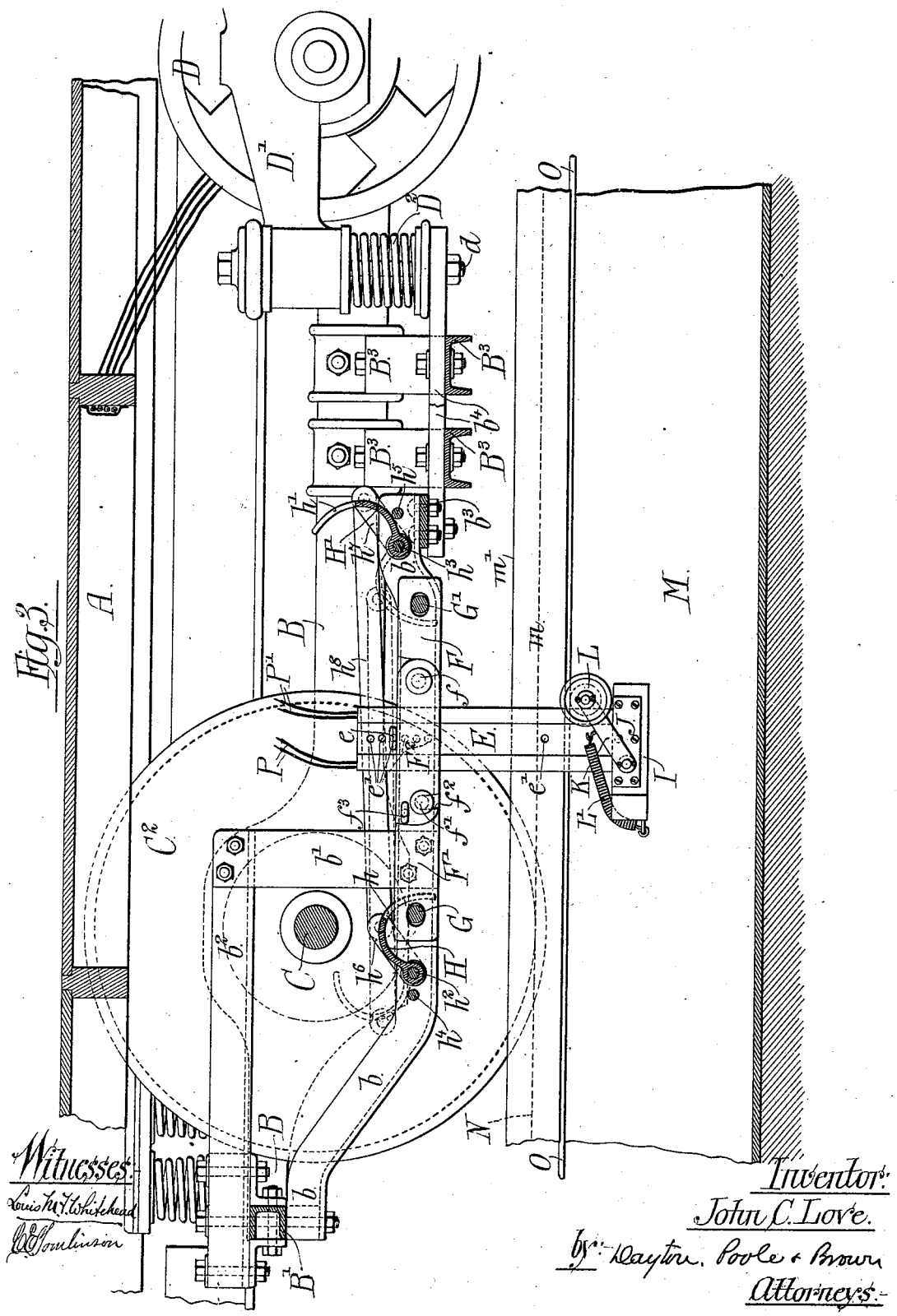
Witnesses
Louis M. Whitehead
C. C. Tomlinson
Inventor:
John C. Love.
by Dayton, Poole & Brown
Attorneys.

(No Model.) 5 Sheets—Sheet 4.
J. C. LOVE.
TROLLEY FOR CONDUIT RAILWAYS.
No. 511,343. Patented Dec. 26, 1893.
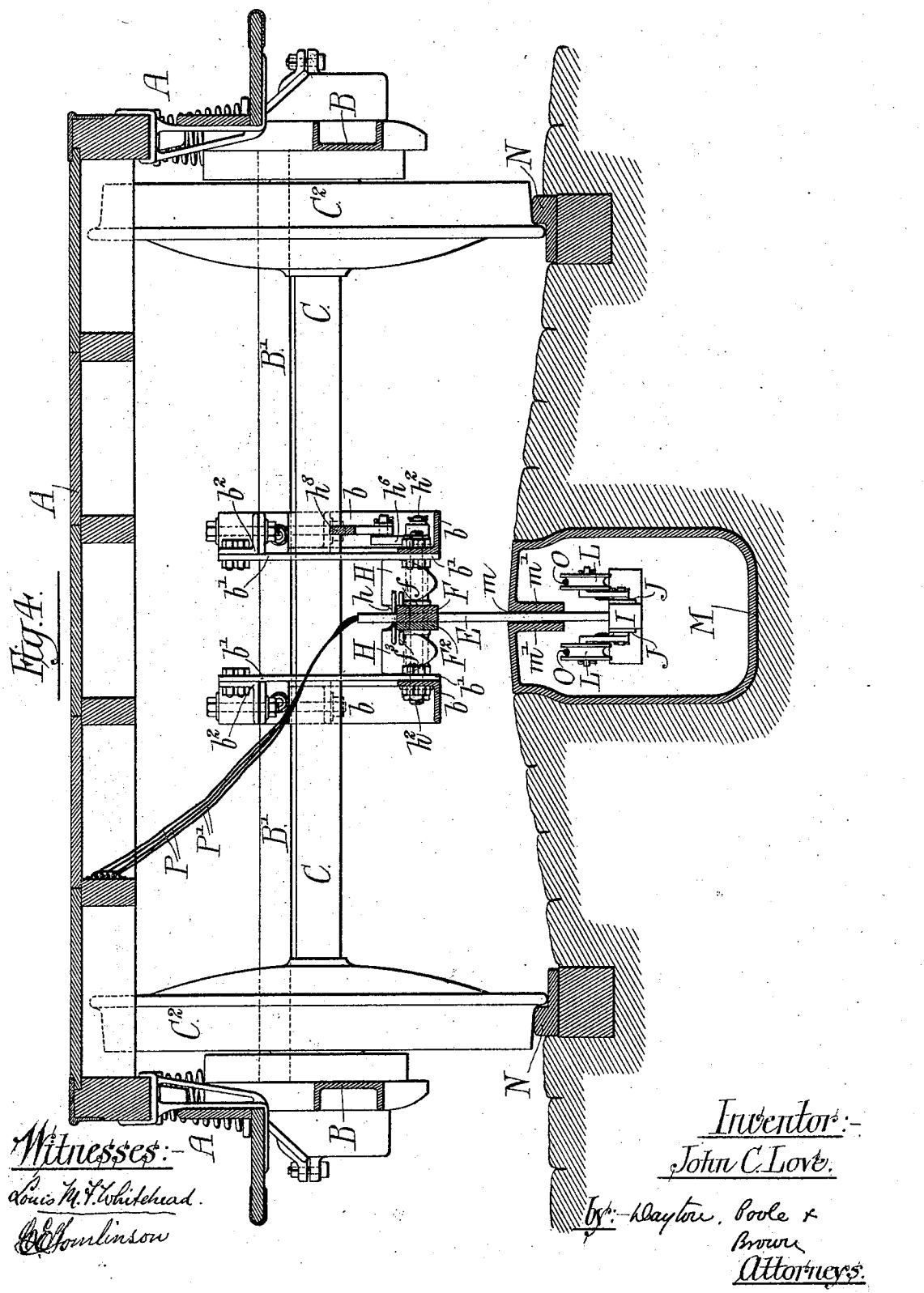

(No Model.) 5 Sheets—Sheet 5.
J. C. LOVE.
TROLLEY FOR CONDUIT RAILWAYS.
No. 511,343. Patented Dec. 26, 1893.
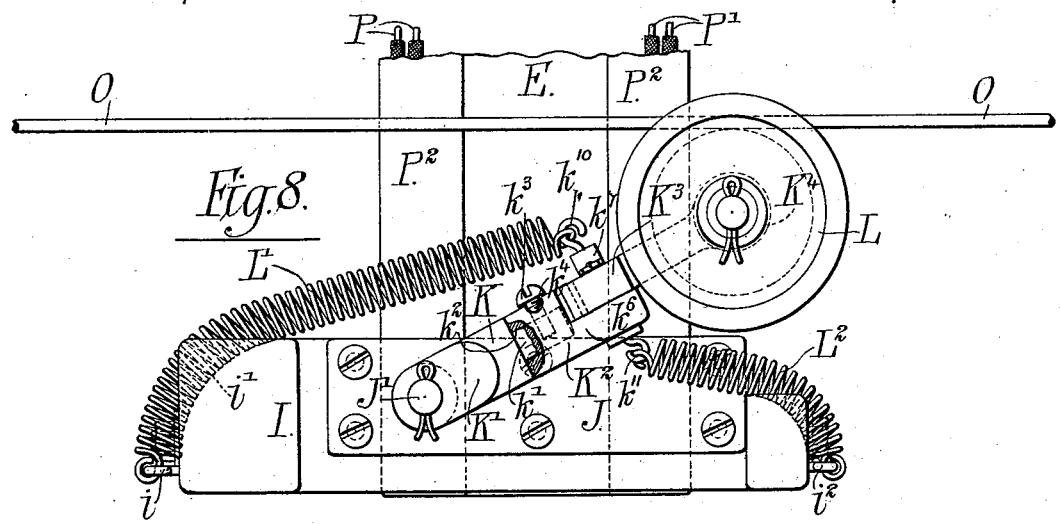
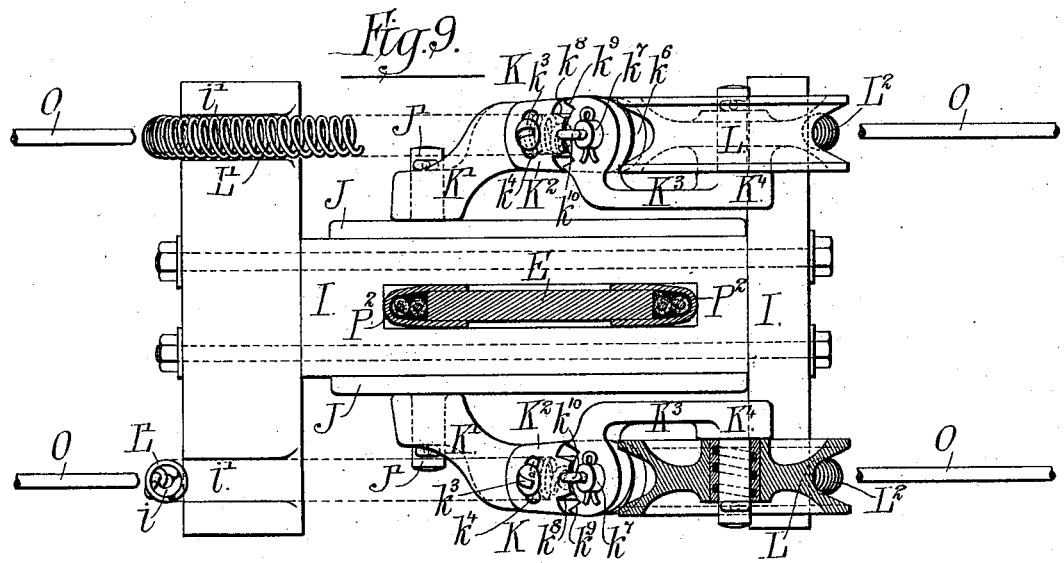
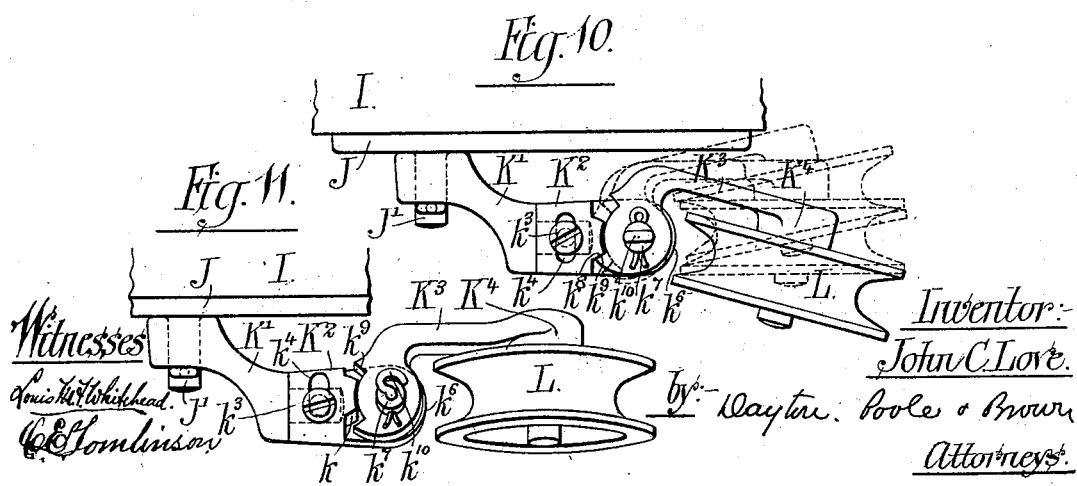

UNITED STATES PATENT OFFICE.

JOHN C. LOVE, OF CHICAGO, ILLINOIS, ASSIGNOR TO THE LOVE ELECTRIC TRACTION COMPANY, OF SAME PLACE.

TROLLEY FOR CONDUIT RAILWAYS.

SPECIFICATION forming part of Letters Patent No. 511,343, dated December 26, 1893.

Application filed May 17, 1892. Serial No. 433,369. (No model.)

*To all whom it may concern:*

Be it known that I, JOHN C. LOVE, of Chicago, in the county of Cook and State of Illinois, have invented certain new and useful Improvements in Electric Railways; and I do hereby declare that the following is a full, clear, and exact description thereof, reference being had to the accompanying drawings, and to the letters of reference marked thereon, which form a part of this specification.

This invention relates to improvements in electric railways of that class wherein the electric conductor or conductors conveying the currents from the central generating plant to the motors on the cars are located within a slotted conduit beneath the surface of the road-way and wherein traveling contact devices are attached to the car and extend into the said conduit for conducting the current from the conductors therein to the car.

The invention embraces more particularly improvements in traveling contact devices and means for supporting the same upon the car, and it consists in the matters hereinafter described and pointed out in the appended claims.

In the accompanying drawings: Figure 1 is a view in central vertical section of the traveling contact devices embodying my invention, together with adjacent parts of the car and conduit. Fig. 2 is an enlarged horizontal or plan section of the parts upon the car, taken on line 2—2 of Fig. 1. Fig. 3 is an enlarged detail section taken on line 3—3 of Fig. 2. Fig. 4 is an enlarged cross-section taken on the line 4—4 of Fig. 1. Fig. 5 is a detail vertical section on line 5—5 of Fig. 2. Fig. 6 is a detail plan view of parts shown in Fig. 2, illustrating the movement of the trolley carrying bar. Fig. 7 is a detail section taken on line 7—7 of Fig. 2. Fig. 8 is an enlarged detail side view of the contact device within the conduit. Fig. 9 is a plan view of the same. Fig. 10 is a detail view showing one of the contact devices, illustrating changed positions thereof. Fig. 11 is a similar view showing other changed positions thereof.

As shown in the said drawings, A indicates the frame or platform of the car, B the truck-frame, C C' the wheel axles, and $C^2$ $C^2$ the wheels thereon.

D indicates the electric motor, which is mounted on a frame D' pivotally supported on one, C', of the wheel axles at one end and connected at its other end with the truck frame B by means of a bolt, $d$, and spring, $D^2$, in a manner heretofore common.

E indicates a vertical supporting bar or arm which is attached at its upper end to the truck and extends downwardly through the slot of the conduit, into the same for sustaining the traveling contact device. Said bar E is supported at its upper end by a horizontal carrying bar, F, arranged longitudinally of the car beneath the center of the same and provided at its middle part with a guide-aperture through which said bar E is adapted to slide vertically, and with means by which said bar is detachably connected therewith. The bar F is engaged at its opposite ends with two transversely arranged horizontal guide bars, G G', with which the ends of the bar F have sliding connection so that either end of said bar F may move or slide laterally thereon. The guide bars G G' may be supported in any suitable manner from the truck frame. As herein shown, the said guide bars G G' are secured at their ends in the vertical flanges of two longitudinally arranged angle bars, $b\ b$, suitably supported from the truck frame. In the particular construction herein illustrated said bars $b\ b$ are supported at their ends adjacent to the axle C by being extended upwardly and bolted to an end cross-girt B' of the truck frame, and also by means of vertical bars $b'$ $b'$ attached at their upper ends to longitudinal bars $b^3$ $b^2$ which extend over the wheel axle and are also attached to said cross-girt B'. The ends of said angle bars adjacent to the motor D are shown as attached to a cross-piece $b^3$ which is secured at its ends to inclined frame bars $b^4$ $b^4$ which are attached to central cross-girts $B^3$ $B^3$ of the truck frame; said bars $b^4$ $b^4$ also affording support for the motor frame D', in the manner illustrated.

The carrying bar being supported upon horizontal, transversely arranged guide rods, is obviously adapted for lateral movement, and the general purpose of this construction is to permit the supporting bar E and contact devices thereon to be moved or shifted laterally with reference to the car truck and to thereby prevent binding of the said arm upon the sides of the slot in the conduit.

The carrying bar F, while adapted to slide freely at both ends upon the guide rods G G', is not left free to move laterally at both ends when the car is running, but a detachable holding device or retainer is provided at each end of the carrying bar, whereby either one end or the other thereof may be held from movement and the other end left free, so that one end of the bar may swing or oscillate laterally while the other end is held from sidewise movement. The general purpose of this construction is to enable one end of the carrying bar to move sidewise when the car is going in one direction, and the other end to move sidewise when the car is going in the opposite direction, thereby affording a uniform action of the parts under all circumstances. Devices herein shown for this purpose are made as follows: H, H', are movable notched plates or retainers, adapted to engage the ends of the bar F. Said retainers are provided with notches, $h, h'$, of the proper size to receive the end of the bar F, and the retainers are made movable toward and from the bar so that they may be engaged with and disengaged therefrom at pleasure. The outer ends of said notches are preferably widened or made divergent, as shown, so as to form guide surfaces to insure the proper engagement of the retainer with the bar, and to shift the end of the bar to its central position in case it is located at one side or the other thereof at the time the retainer is advanced toward the bar for engaging the same.

In the particular construction herein shown the retainers H H' are pivotally supported so as to have oscillatory movement toward and from the ends of the bars, said holders being attached to rock-shafts, $h^2$, $h^3$, which have bearings at their ends in the vertical flanges of the angle-bars $b\ b$. Suitable stops are provided for limiting the backward movement of the retainers, said stops being herein shown as formed by means of rods, $h^4$, $h^5$, secured at their ends to the angle irons $b\ b$ and extending between the same at the rear of the rock shafts $h^2\ h^3$.

For the general purposes of the invention the retainers H H' may be moved by hand for the purpose of engaging them with or disengaging them from the carrying bar, but said retainers are herein provided, as a more convenient means of operating the same, with a device connecting the rock-shafts $h^2\ h^3$ in such manner that said rock shafts will be turned or rotated together in the same direction, so that when one of the retainers is lifted or thrown backwardly away from one end of the carrying bar the other retainer will be thrown forward or downward into engagement with the opposite end of said bar. As a convenient means of accomplishing this result I have provided said rock shafts $h^2\ h^3$ with crank-arms, $h^6$, $h^7$, the outer ends of which are pivoted to a connecting rod, $h^8$.

The extent of the oscillatory movement of the retainers is somewhat less than a one-half rotation, and the parts are so arranged that when one of the retainers is moved by the hand to engage it with or disengage it from the carrying bar, a corresponding movement will be transmitted to the other retainer.

In order to enable the retainers to be easily actuated I have shown the rock shaft $h^3$ of one of them extended to form an actuating shaft, $h^9$, which extends to the side of the car (Fig. 7) and is there provided with a hand lever by which it may be easily turned to move the retainer to which the shaft is attached.

As shown in the drawings, the bar F is provided with a central opening or slot through which the bar E passes and in which it is adapted to slide vertically; said bar being supported at a desired height by means of a pin, $e$, inserted through one of the series of holes, $e', e', e'$, in the upper part of the bar and adapted to rest upon the top edge of the carrying bar F. To provide for detaching the arm E laterally from the said carrying bar, the latter is made in two pieces or parts, to wit, a main part, F', provided with a central notch forming the central opening or slot, and a plate or latch, $F^2$. Said latch $F^2$ is hinged or pivoted at one end to the part F' at one side of the notch by a pivot stud, $f$, so as to swing in a vertical plane, while its free end is adapted to engage with the part F' at the opposite side of the notch, being for this purpose provided with a notch, $f^2$, which is adapted to engage with a headed stud, $f'$, on said part F'. The end of said plate $F^2$ is positively locked or held in place when engaged with the stud $f'$ by means of a cotter-pin $f^3$, which is inserted through a hole, $f^4$, in the plate $F^2$ and through a corresponding hole in the section F'. The plate $F^2$ enables the supporting bar E to be easily disengaged from the carrying bar when it is desired to remove the contact device from the car. The sliding of the said bar E vertically in the carrier bar allows the contact device to be lifted above or out of the conduit without disengaging it from the carrier bar. This construction enables the cars to be easily run upon side tracks in a barn or elsewhere when not in use, the bar with the contact devices thereon being at such time lifted above the surface of the ground and the arm E being secured in its elevated position by a suitable fastening device, that herein shown consisting of a hole, $e'$, near the lower end of the bar through which hole a cotter pin is inserted in position to rest on the carrying bar and thereby hold the bar in its elevated position, as shown in Fig. 5.

The contact device herein shown embodies certain features of improvement and is constructed as follows: To the lower end of the bar E is attached a block, I, of insulating material, to each side of which is secured a metal plate, J, provided with an outwardly extending horizontal bearing pin, J'. Mounted upon said bearing pin is a vertically swinging trolley arm, K, carrying at its outer end a wheel or trolley, L. The arm K consists of three separate pieces or sections, K', K², K³, and these parts are pivotally connected with each other in such manner that the extreme end of the arm is adapted to turn or rotate about an axis extending longitudinally of the arm, and also about a transverse axis arranged in a vertical plane. The arm being adapted to swing in a vertical plane about the pivot J', its free end and the trolley thereon are therefore free to move in three different directions, to wit, it is adapted to rise and fall in a vertical direction; to swing or rotate on its own axis, and to swing laterally on its vertical, transverse axis.

The forms of pivotal connection between the parts K', K² and K³ herein shown are as follows: The part or section K' is provided at its outer end with a cylindric pin, $k'$, which enters a socket, $k^2$, in the section K², said section K² being held in engagement with the bearing pin by means of a screw stud, $k^3$, which passes through a transverse slot, $k^4$, in the section K² and is secured to the said bearing pin so as to permit a limited oscillatory movement of the section K² on the bearing pin, while holding the said parts from shifting endwise or becoming detached. Said section K² is provided at its outer end with a lug, $k^6$, through which is inserted a transverse bearing pin, $k^7$, on which is pivoted the outer section K³ of the arm; said outer section being provided with a hub, K⁴, which is offset from the main part of the arm so that the trolley wheel L comes opposite or in the same vertical plane with the pivot pin $k^7$. The pivot pin or stud $k^7$ being arranged in a vertical plane, on the same plane in which the entire arm K swings or moves, the outer section K³ is adapted to oscillate laterally, or, in other words, to allow the trolley wheel to swing toward and from the center of the conduit. This oscillatory movement of the outer section K³ is limited by the opposing surfaces or shoulders, $k^8$, $k^9$, on the sections K² and K³ respectively so as to maintain the trolley wheel approximately in its working position when disengaged from the conducting wires.

In Fig. 4 is shown in cross-section the conduit M, and track rails, N, said conduit being provided with a central slot, $m$, having deep flanges, $m'$, $m'$, at either side thereof, which form lateral spaces or grooves, in which are located the conducting wires, O, O. The depending flanges $m$ $m$ thus arranged serve to protect the wires and prevent the access thereto of mud or water which may enter the conduit through the slot. The wires in a conduit of this kind are necessarily heavy and supported at frequent intervals and stretched very tight, so that they are relatively stiff and unyielding and incapable of any considerable lateral movement, and the trolley carrying device being held from lateral movement by the sides of the slot which engage the arm E, it is obvious that considerable freedom of movement and capacity for adjustment in the trolley wheels is necessary in order to enable them to follow the wire notwithstanding lateral variations in its position with reference to the central slot of the conduit. For this purpose the arm K is jointed, as described, the longitudinal pivot enabling the trolley wheel to assume a transversely inclined position, as seen in Fig. 8, so as to bear directly upon the wire when the arm K is shifted slightly from its central position beneath the same, while the transverse pivot enables the trolley wheel to swing laterally and to thereby follow the wire easily and smoothly in passing around curves.

L' is a coiled spring attached at one end to the arm K near its free end, and at its opposite end to the block I in such manner that the tension of the spring will tend to hold the free end of the arm elevated and the trolley wheel thereon in contact with the conducting wire. The spring is shown as secured at one end to an eye, $k^{10}$, attached to the stud $k^7$, and at its opposite end to an eye, $i$, secured to the end of the block I; the part of the spring adjacent to the eye $i$ being carried over a curved bearing surface, $i'$, of the block. L² is a spring which is connected with the said arm K and extends downwardly to and is connected with said block I. Said spring L² serves to restrain the arm K from rising to a vertical position, and therefore avoids possibility of the said arm being thrown backwardly past or over the pivot J' when the vehicle is moving in a direction to carry the contact device with the free end of the arm K forward. Said spring L² is shown as attached to an eye, $k^{11}$, secured in the lower end of the stud $k^7$ and to an eye, $i^2$, in the end of the block I.

While I have shown the trolley wheel as mounted upon the end of the arm K to make contact with the conductor, yet as far as the operation of the said arm is concerned, a sliding or other form of contact device may be employed in place of the said trolley wheel with the same general results.

Two conducting wires are shown in the drawings as located in the conduit, and the traveling contact device embraces two separate arms K, and wheels or contact pieces thereon. In the construction illustrated the plates J J carrying the said arms K are electrically insulated from each other by the block I and separate electric conductors, P, P', extend from the said plates to the motor on the car, this construction obviously being adapted for use in connection with a distributing system wherein both the supply and return conductors are formed by conducting wires. The features herein claimed as my invention, however, may be applied as well to other systems of distribution, as for instance, where a single conducting wire only is used and the track rail constitutes a return conductor. The conductors P P' which lead from the plates J J to the motor are herein shown as secured to the bar E, where they extend along the same, by means of U-shaped plates, P², P², which embrace the edges of the plates and form inclosed spaces or channels within which the conductors are placed.

An important feature of the construction herein shown is that embracing a laterally movable connection between the upper end of the supporting bar E and the car, whereby said supporting bar while held in a vertical position is free to move laterally with reference to the car and may thus adjust itself to the lateral movement or variations in the position of the car or car truck relatively to the conduit slot, in which the said supporting bar closely fits and travels, and a further important feature of the invention is embraced in the construction wherein, in connection with the supporting bar so connected with the car or truck, is employed a contact device having trolley wheels or contact pieces which are free to move both laterally and vertically with reference to the supporting bar, so that while the said bar is allowed to follow the slot notwithstanding lateral variations in the position of the car or truck, the trolley wheel or contact device is also adapted to follow the wire notwithstanding lateral variations of the wire from strict parallelism with the said slot. The particular devices herein shown for connecting the said supporting bar with the car or truck have the advantage of affording a simple and effective means of affording such lateral movement of the supporting bar under varying conditions, and are herein claimed as parts of my invention.

The swivel joint between the sections or parts K' and K² of the arm K is of importance, inasmuch as it affords the principal means of permitting lateral movement of the top of the trolley L with reference to the supporting bar E, in order to compensate for variations of the conductor from strict parallelism with the conduit slot. The pivotal connection between the sections K² and K³, in the construction shown, not only allows the trolley or contact piece to assume an angular position with reference to the slot in passing around curves, but insures that the contact piece or trolley wheel shall remain parallel with the wire or approximately in the same plane therewith so as to run smoothly thereon; it being obvious that when the arm K is inclined in the manner shown in the drawings, the rotation of the section K² on the section K' or of the section K³ on the section K² will itself tend to throw the wheel L out of the same plane with the wire, but that a partial turning of both of said parts will permit the wheel to remain exactly in the same plane with the wire. It is obvious, furthermore, that the pivotal joints arranged as described, insure the smooth traveling of the trolley on the wire whatever may be the angular position of the arm K. As for instance, if the parts are so arranged that said arm is depressed into a horizontal position when the rolley wheel is engaged with the wire, the lateral movement of the part of the trolley wheel engaged with the wire will be secured by rotation of the part or section K² on the part or section K', while if the said arm K is more nearly vertical said lateral movement will be afforded mainly by movement of the section K³ on the pivot $k^7$.

It will of course be understood that the trolley wheel if free to take the position most favorable for running smoothly on the wire will stand parallel with the same or in the same plane with the wire, and, as before stated, such freedom of movement in the trolley wheel will be afforded by the two joints arranged in the manner set forth.

I claim as my invention—

1. The combination with a car and slotted conduit and a conductor therein, of a traveling contact device embracing a bar extending through the slot of the conduit, a support for said bar mounted on the car and laterally movable thereon, a vertically movable trolley or contact piece supported on said bar and bodily movable laterally with reference to the part of said bar, and a spring applied to throw said trolley or contact piece upwardly into contact with the said conductor, substantially as described.

2. The combination with a car, a slotted conduit and a conductor therein, of a traveling contact device within the conduit, a bar for supporting said contact device extending through the slot of the conduit, a longitudinally arranged carrying bar to which said supporting bar is attached and which has laterally movable connection at both ends with the car frame and means for holding either end of the bar from lateral movement at will, substantially as described.

3. The combination with a car, a slotted conduit and a conductor therein, of a traveling contact device within the conduit, a bar for supporting said contact device extending through the slot of the conduit, and a support for said bar embracing a horizontal carrying bar arranged longitudinally on the car and having laterally sliding connection at both ends with the car frame, and detachable retainers adapted to separately engage the opposite end of the carrying bar for holding either end of the same from lateral movement while allowing the opposite end to move freely, substantially as described.

4. The combination with a car, a slotted conduit and a conductor therein, of a traveling contact device within the conduit, a bar for supporting said contact device extending through the slot of the conduit, and a support for said bar embracing a horizontal carrying bar arranged longitudinally on the car and having laterally sliding connection at both ends with the car frame, means for holding either end of said bar from lateral movement and means for detachably securing said supporting bar to the carrying bar, substantially as described.

5. The combination with a car, a slotted conduit and a conductor therein, of a traveling contact device embracing a supporting bar extending through the slot of the conduit, a longitudinally arranged carrying bar on the car, having laterally movable connection at both ends with the car frame, means for holding either end of said supporting bar from vertical movement, a vertically movable trolley or contact piece carried by said supporting bar and bodily movable laterally with reference to the path of said car, and a spring applied to throw said trolley or contact piece upwardly into contact with the conductor, substantially as described.

6. The combination with a car, a slotted conduit and a conductor therein, of a traveling contact device within the conduit, a bar for supporting said contact device extending through the slot of the conduit, and a support for said bar embracing a laterally movable carrier bar, to which said supporting bar for the contact device is detachably connected and with which said supporting bar has vertically sliding connection, substantially as described.

7. The combination with a car, a slotted conduit and a conductor therein, of a traveling contact device within the conduit, a bar for supporting said contact device extending through the slot of the conduit, a support for said bar embracing a carrying bar having laterally sliding connection with the car frame at both ends, detachable retainers adapted to hold either end of said carrying bar from lateral movement, and operative connections between said retainers whereby one of the same will be engaged with the carrying bar at the time the other is disengaged therefrom, substantially as described.

8. The combination with a car frame, a traveling contact device, a vertical supporting bar and a horizontal, laterally movable carrying bar having horizontally sliding connection at both ends with the car frame, of two oscillating, notched retainers adapted to engage the ends of said carrying bar, substantially as described.

9. The combination with a car frame, a traveling contact device, a supporting bar and a horizontal, laterally movable carrying bar having horizontally sliding connection at both ends with the car frame, of two oscillating, notched retainers adapted to engage the ends of said carrying bar, actuating arms attached to said retainers and a connecting rod pivoted to said actuating arms whereby both of the retainers will be moved together, substantially as described.

10. The combination with the car frame provided with transverse parallel guide rods, of a carrying bar provided with bearing apertures engaging said guide rods, movable retainers adapted to engage the ends of said carrying bar adjacent to the guide rods, and a supporting bar for a contact device connected with said carrying bar between the ends thereof, substantially as described.

11. The combination with a laterally movable carrying bar, of a supporting bar for a contact device, said carrying bar being provided with a guide aperture through which the supporting bar is adapted to vertically slide, and with a movable plate forming one side of said bearing aperture whereby the supporting bar may be removed laterally therefrom, substantially as described.

12. The combination with a slotted conduit and car, of a traveling contact device comprising a supporting bar attached to the car and extending into the conduit, a trolley wheel or contact device, and an arm for supporting the trolley wheel pivoted to the supporting bar and adapted to swing in a vertical plane, said trolley wheel or contact device being connected with the arm by means affording lateral movement thereof relatively to the arm, substantially as described.

13. The combination with a slotted conduit and car, of a traveling contact device comprising a supporting bar attached to the car and extending into the conduit, a trolley wheel or contact piece, an arm for supporting the trolley wheel or contact piece pivoted to the supporting bar and adapted to swing in a vertical plane, and a spring applied to lift said arm, said trolley wheel or contact piece being connected with the arm by means including a pivotal joint the axis of which is arranged longitudinally of the arm, substantially as described.

14. A traveling contact device for electric railways, comprising a supporting bar, a trolley wheel or contact piece thereon, and an arm for supporting the trolley wheel or contact piece pivoted to the supporting bar and adapted to swing in a vertical plane, and provided between its ends with two pivotal or swiveled joints, one affording rotary motion of the trolley wheel or contact piece on an axis longitudinal to the arm and the other a lateral, oscillatory movement thereof about an axis transverse to the arm, substantially as described.

15. A traveling contact device for electric railways comprising a supporting bar, a trolley wheel or contact piece, and an oscillating arm for supporting the same, adapted to swing in a vertical plane, a spring applied to the said arm, tending to lift the free end thereof, and a second spring applied to limit the upward movement of the free end of the arm, substantially as described.

In testimony that I claim the foregoing as my invention I affix my signature in presence of two witnesses.

JOHN C. LOVE.

Witnesses:
C. CLARENCE POOLE,
G. W. HIGGINS, Jr.